United States Patent [19]

Bader et al.

[11] Patent Number: 5,725,962
[45] Date of Patent: Mar. 10, 1998

[54] ORIENTED HDPE FILMS WITH METALLIZED SKIN LAYER

[75] Inventors: Michael J. Bader, Fairport; Jeffrey J. O'Brien, Walworth; Kelli Lee Riddle, Rochester, all of N.Y.

[73] Assignee: Mobil Oil Corporation, Fairfax, Va.

[21] Appl. No.: 455,734

[22] Filed: May 31, 1995

Related U.S. Application Data

[63] Continuation-in-part of Ser. No. 206,574, Mar. 4, 1994, which is a continuation-in-part of Ser. No. 160,551, Dec. 1, 1993, abandoned.

[51] Int. Cl.$^6$ .................................................... B32B 27/32
[52] U.S. Cl. .................... 428/515; 428/516; 428/523; 428/461; 428/447; 428/35.7; 428/35.8; 428/35.9; 428/327
[58] Field of Search ............................ 428/515, 516, 428/523, 461, 327, 447, 35.7, 35.8, 35.9

[56] References Cited

U.S. PATENT DOCUMENTS

| | | | |
|---|---|---|---|
| 4,343,852 | 8/1982 | Isaka et al. | 428/216 |
| 4,400,428 | 8/1983 | Rosenthal et al. | 428/349 |
| 4,419,411 | 12/1983 | Park | 428/516 |
| 4,502,263 | 3/1985 | Crass et al. | 53/396 |
| 4,692,379 | 9/1987 | Keung et al. | 428/349 |
| 4,734,317 | 3/1988 | Bothe et al. | 428/215 |
| 4,865,908 | 9/1989 | Liu et al. | 428/248 |
| 4,870,122 | 9/1989 | Lu | 524/488 |
| 4,916,025 | 4/1990 | Lu | 428/516 |
| 5,302,442 | 4/1994 | O'Brien et al. | 428/213 |
| 5,314,749 | 5/1994 | Shah | 428/349 |
| 5,451,468 | 9/1995 | Seiler et al. | 428/515 |
| 5,453,318 | 9/1995 | Giacobbe | 428/286 |

OTHER PUBLICATIONS

*Encyclopedia of Polymer Science and Engineering*, Vol. 7, pp. 116–127, John Wiley & Sons, Inc., 1987.

*Primary Examiner*—Marie R. Yamnitzky
*Attorney, Agent, or Firm*—Jessica M. Sinnott; Dennis P. Santini

[57] ABSTRACT

A metallizable multilayer film structure of enhanced bond strength comprises a) a flame or corona discharge treated upper skin layer (a) consisting essentially of ethylene-propylene-butylene terpolymer and low density polyethylene;

b) a base layer comprising high density polyethylene, and c) a lower skin layer (c) comprising ethylene-propylene-butylene terpolymer and an antiblock component selected from the group consisting of silicone oil and silicone particulate.

5 Claims, No Drawings

ORIENTED HDPE FILMS WITH METALLIZED SKIN LAYER

CROSS-REFERENCE TO RELATED APPLICATIONS

This application is a continuation-in-part of pending prior application Ser. No. 08/206,574, filed Mar. 4, 1994, which is a continuation-in-part of prior application Ser. No. 08/160,551, filed Dec. 1, 1993 (now abandoned), the contents of which are incorporated herein by reference.

FIELD OF THE INVENTION

This invention relates to thermoplastic films and more particularly to films of metallized oriented high density polyethylene (HDPE) which have a metallized skin with good metal adhesion, good dead-fold characteristics, twistability, printability and capable of generating high bond strengths between the metallized layer and a polypropylene layer, e.g., extrusion lamination bond strength or adhesive bond strength.

BACKGROUND OF THE INVENTION

Blown films of HDPE having an ethylene-vinyl acetate heat seal coating are used for food packaging but such films must have a thickness of about two mils to meet the water vapor transmission (WVTR) requirements for packaging suitable for dry foods such as cereals. Moreover, blown HDPE films do not exhibit the dead-fold properties desirable in food packages particularly of the bag-in-box type.

U.S. Pat. Nos. 4,870,122 and 4,916,025 (Lu) describe HDPE films which have good WVTR properties at film thicknesses of about one mil. The films are produced from high density polyethylene (HDPE) having a density of 0.96 or higher and are biaxially oriented in an imbalanced manner to a degree of about 1.25:1 to about 2:1 in the machine direction (MD) and to a degree of about 6:1 to about 12:1 in the transverse direction (TD). These films have reduced water vapor transmission (WVTR), improved dead-fold characteristics and other physical characteristics which are markedly better than blown HDPE films which can be further improved by the addition of microcrystalline wax. When provided with a heat seal layer by co-extrusion or coating, the films are particularly well suited for use in packaging foods in bag-in-box operations conducted on vertical, form, fill and seal (VFFS) machinery. While the imbalanced orientation confers the desired overall combination of properties on the film, the high degree of orientation in the transverse direction tends to make the film weak in this direction so that it tears relatively easily.

U.S. Pat. Nos. 4,343,852, 4,400,428, 4,419,411, 4,502,263, 4,692,379, and 4,734,317, all of which are incorporated herein by reference, disclose films having a base layer of polypropylene polymers and sealable skin layers on one or more sides of the base layer. However, these structures do not comprise HDPE base layer and typically lack good deadfold properties while having higher water vapor transmission rates associated with polypropylene. Given the differences between polypropylene and HDPE, e.g., in melting point (348° F. for PP, 279° F. for HDPE), processing polypropylene films requires different extrusion temperature, extruder screw design, die design draw down ratio, machine direction orientation temperature and percent, as well as transverse direction orientation temperature and rate.

U.S. Pat. No. 5,302,442 to O'Brien, et al. discloses thermoplastic films comprising a high density polyethylene base layer and skins comprising ethylene-propylene-butene terpolymer, low density polyethylene, and polybutene.

The bonding of metals, such as, aluminum, silver, chromium, etc., to plastic films and the gas barrier developed, has allowed such films to replace metallic foils in many instances. The flexibility of the films necessitates the formation of a strong metal/plastic bond and a number of approaches have been developed for providing such bonding. In some cases a special primer layer must be applied to the base layer in order to achieve an effective bond between the metal and the substrate. In many cases a thermoplastic surface must be corona discharged treated in order for there to be an effective bond between the metal and the thermoplastic surface. Gas barrier properties will also depend upon the condition of the surface on which the metal is deposited.

It is an object of the present invention to provide a metallized film having a far greater metal to plastic adhesion level than that obtainable by corona discharge treating alone or priming of a substrate layer. It is a further object of the invention to provide a metallized film which exhibits excellent bond strengths in both adhesive and extrusion lamination, particularly where bonding between the metallized film and a polypropylene film is desired.

Metallized film comprising oriented high density polyethylene substrate layer is desirable for the good dead-fold characteristics, twistability, and other characteristics associated with oriented high density polyethylene, as well as the characteristics associated with metallizing such as gas impermeability, opacity, UV light transmission, etc. However, directly metallizing the terpolymer skin, even after corona or flame treating, of an oriented high density polyethylene film can result in less than adequate metal adhesion to the skin as well as inadequate bond strengths in both adhesive and extrusion lamination, especially when adhering to or extruding with polypropylene films.

SUMMARY OF THE INVENTION

The present invention relates to providing a film having good dead fold properties, optical clarity, good slip properties, and good receptivity to metallizing.

The present invention relates to a film of high density polyethylene (HDPE) that can have coextruded skin resin, laminated film or coating on at least one side, preferably both sides, of the HDPE base layer. Preferably such skin resins are heat sealable skin resins which, for present purposes, are those which seal at a minimum seal temperature below the distortion temperature of HDPE base layer film.

The present invention also relates to an oriented polymer film which comprises:

a) a treated upper skin layer (a) having a surface coextensively adherent to the upper surface of a base layer (b), and a treated metallizable surface, said upper skin layer (a) consisting essentially of ethylene-propylene-butene-1 terpolymer and low density polyethylene (LDPE), b) a base layer (b) comprising high density polyethylene, having an upper surface and lower surface, c) a lower skin layer (c) having a surface adherent to said lower surface of base layer (b), and an exposed surface, said lower skin layer (c) containing at least one polymer selected from the group consisting of ethylene-propylene-butene-1 terpolymer, ethylene-propylene random copolymer, ethylene-propylene block copolymer, isotactic polypropylene, low density polyethylene (LDPE), very low density polyethylene (VLDPE), linear low density polyethylene (LLDPE), medium density polyethylene (MDPE), said lower skin layer (c) further comprising a component selected from the group consisting of i) a particulate cross-linked hydrocarbyl-substituted polysiloxane anti-blocking agent and ii) silicone oil.

The present invention further relates to a multilayer film structure which comprises a) a treated upper skin layer (a) consisting essentially of ethylene-propylene-butylene terpolymer and low density polyethylene;

b) a base layer (b) comprising high density polyethylene, and c) a lower skin layer (c) comprising ethylene-propylene-butylene terpolymer and an antiblock component selected from the group consisting of silicone oil and silicone particulate.

The present invention further relates to a metallized oriented polymer film which comprises:

a) an upper skin layer (a) having an inner surface adherent to the upper surface of a base layer (b), and an outer treated surface which is metallized, said upper skin layer (a) consisting essentially of ethylene-propylene-butene-1 terpolymer and low density polyethylene (LDPE), b) a base layer (b) comprising high density polyethylene, having an upper surface and lower surface, c) a lower skin layer (c) having an inner surface adherent to said lower surface of base layer (b), and an outer surface, said lower skin layer (c) containing at least one polymer selected from the group consisting of ethylene-propylene-butene-1 terpolymer, ethylene-propylene random copolymer, ethylene-propylene block copolymer, isotactic polypropylene, low density polyethylene (LDPE), very low density polyethylene (VLDPE), linear low density polyethylene (LLDPE), medium density polyethylene (MDPE), said skin layer further comprising a component selected from the group consisting of i) a particulate cross-linked hydrocarbyl-substituted polysiloxane anti-blocking agent and ii) silicone oil.

The present invention is further directed to oriented high density polyethylene films comprising a metallized treated ethylene-propylene-butylene terpolymer-containing skin layer whereby an improvement in bond strength between said skin and a polypropylene layer is obtained by providing a low density polyethylene in the skin prior to treating and metallizing.

In another aspect the invention relates to metallized oriented polymer film comprising:

a) an upper skin layer (a) having an inner surface coextensively adherent to the upper surface of a base layer (b), and an outer treated surface which is metallized, said upper skin layer (a) comprising ethylene-propylene-butene-1 terpolymer, b) a base layer (b) comprising high density polyethylene, having an upper surface and lower surface, c) a lower skin layer (c) having an inner surface adherent to said lower surface of base layer (b), and an outer surface, said layer (c) containing ethylene-propylene-butene-1 terpolymer, whereby bond strength of the metallized upper layer (a) to polypropylene is increased by providing an upper skin layer containing 5 to 25 wt % of low density polyethylene, based on the total weight of said upper layer (a).

In another aspect, the present invention relates to a method of making a multilayer film which comprises:

i) coextruding a multilayer film comprising a) a skin layer (a) having a surface adherent to the surface of a base layer (b), said skin layer (a) consisting essentially of ethylene-propylene-butene-1 terpolymer and low density polyethylene (LDPE) and said base layer (b) comprising high density polyethylene, ii) treating the exposed surface of said skin layer (a) by corona discharge or flame treatment, and iii) metallizing said treated skin layer (a), and optionally, iv) bonding the metallized surface of said metallized treated skin layer (a) to a polypropylene layer.

DETAILED DESCRIPTION

Base Layer

Base layer (b) is derived from imbalanced biaxially oriented film base layer made from a major proportion, say, at least 50 wt % of the total base layer, of a high density polyethylene (HDPE) having a density of at least 0.96. Suitable high density polyethylene resins for preparation of the base layer of the present films are described in U.S. Pat. No. 4,870,122, incorporated herein by reference in its entirety. The base layer film can be composed exclusively of a single HDPE resin, a mixture of HDPE resins, or of HDPE containing a minor proportion of other resource polymers. These high density polyethylenes typically have a melt index from about 0.5 to about 10, usually from about 0.7 to 2. The mixture of HDPE resins gives better processing characteristics in the extruder by reducing extruder torque. Films made with a blend of HDPE resins reduce splittiness of the film which manifests itself as the tendency of the film to break in the TD direction during operation on vertical, form, fill and seal (VFFS) machinery.

The blends of HDPE polymers can comprise two or more polymers all of which preferably have densities of 0.96 or greater. Blends of HDPE polymers advantageously comprise a major proportion of HDPE having a melt index of 0.5 to 6 and one or more polymers having a different melt index.

Terblends have been found particularly desirable. Suitable terblends generally comprise 50 to 98 weight percent, preferably 84 to 96 weight percent of HDPE having a density of 0.96 or higher and a melt index of greater than 0.5 to about 1.0; 1 to 25 weight percent, preferably 3 to 8 weight percent of HDPE having a density of 0.96 or greater and a melt index of 0.1 to 0.5; and 1 to 25 weight percent, preferably 3 to 8 weight percent, of HDPE having a density of 0.96 or higher and a melt index of greater than 2 to about 8. Preferably, the second and third HDPE polymers which are minor components are present in about equal amounts. Suitable HDPE resins for purposes of the present invention include Fina BDM 94-25 and Oxychem M 6211.

Upper Skin Layer

According to the present invention, the upper skin layer prior to any metallizing comprises ethylene-propylene-butene-1 terpolymer and low density polyethylene (LDPE), very low density polyethylene (VLDPE), and linear low density polyethylene (LLDPE). The blend of ethylene-propylene-butene-1 terpolymer and low density polyethylene comprises 3 to 30 wt % low density polyethylene, preferably 5 to 25 wt % low density polyethylene.

Suitable terpolymers include those containing 3 to 5 wt % ethylene and 3 to 6 wt % butene-1. Such terpolymers are available from Chisso, under the tradename Chisso 7700 Series. Other suitable ethylene-propylene-butene-1 terpolymers include those containing 0.5 to 3 wt % ethylene, and 13 to 20 wt % butylene. Such terpolymers are available from Chisso, under the tradename Chisso 7800 Series.

The low density polyethylene provided in the upper skin layer may be a linear low density polyethylene (LLDPE) or a non-linear polyethylene. These polymers typically have a melt index of 1 to 12. The low density polyethylenes should have a density of 0.88 to 0.93 while the linear materials may have a density as high as 0.94, usually in the range 0.90–0.94, e.g. 0.918 or 0.921, with a melt index from about 1 to about 10. The linear low density polyethylenes may be derived from ethylene together with other higher comonomers such as hexene-1 or octene-1.

In order to enhance its receptivity to metallizing treatment, the outer surface of upper skin layer (a) is treated by such known and conventional techniques as corona discharge and flame treating to enhance surface energy. Such treating is preferably carried out after orientation of the film.

Lower Skin Layer

The lower skin layer (c) can comprise a random ethylene-propylene copolymer. This may be derived from ethylene and one or more co-monomers. The propylene content of these random copolymers is typically from about 70 to 85 weight percent, more usually from about 75 to 85 percent, with the balance of ethylene and any other comonomers such as butylene. Suitable copolymers of this type are random copolymers of ethylene and propylene or random terpolymers of ethylene, propylene and butene-1, especially terpolymers of the type employed in the upper skin layer (a). Preferred copolymers of this type include the following:

Ethylene-propylene copolymers containing 2–10 weight percent random ethylene, e.g. 3–7 weight percent ethylene.

Ethylene-propylene-butene-1 random terpolymers containing 1–5 weight percent random ethylene, 10–25 weight percent random butylene. The amounts of the random ethylene and butylene components in these copolymers are typically in the range of 10 to 25 percent total (ethylene plus butylene). Typical terpolymers of this type include those with about 1–5 percent ethylene and 10–25 percent butylene.

These copolymers typically have a melt flow rate in the range of about 5 to 10 with a density of about 0.9 and a melting point in the range of about 115° to about 130° C.

Preferably, the lower skin layer (c) comprises ethylene-propylene-butene-1 terpolymer. In an especially preferred embodiment the lower skin layer contains said terpolymer as well as low density polyethylene (LDPE) in the same ranges given above for the upper skin layer (a). Indeed, the lower skin layer resin polymer components can be the same as those employed for the upper skin layer.

In a preferred embodiment, the film of the present invention has both its upper skin layer (a) and lower skin layer (c) comprising a mixture of ethylene-propylene-butene-1 terpolymer and low density polyethylene (LDPE). For example, the upper skin layer and lower skin layer can comprise 85 to 95 wt %, say 90 wt %, of ethylene-propylene-butene-1 terpolymer and 5 to 15 wt %, say 10 wt % low density polyethylene (LDPE). However, the lower skin layer which is not metallizable, unlike the treated upper skin layer, can contain antiblock additives as well. Because antiblock additives can interfere with metallizability, they are either not added to the upper skin layer (a) or are present in very minor amounts.

Prior to incorporation in the film, e.g., before extrusion, lower skin layer (c) can be compounded with an anti-blocking effective amount of an anti-blocking agent, e.g., silica, clays, talc, glass, and the like which are preferably provided in the form of approximately spheroidal particles. The major proportion of these particles, for example, anywhere from more than half to as high as 90 weight percent or more, will be of such a size that significant portion of their surface area, for example, from about 10 to 70 percent thereof, will extend beyond the exposed surface of layer (a). In a preferred embodiment, the anti-blocking agent comprises particulate cross-linked hydrocarbyl-substituted polysiloxane anti-blocking agent. Particularly preferred particulate cross-linked hydrocarbyl-substituted polysiloxanes include the polymonoalkylsiloxanes. Most particularly preferred are non-meltable polymonoalkylsiloxanes characterized as having a mean particle size of 0.5 to 20.0 microns and a three dimensional structure of siloxane linkages. Such materials are available from Toshiba Silicone Co., Ltd., worldwide, and in the United States from General Electric Co., and are marketed under the tradename Tospearl. Other commercial sources of similar suitable materials are also known to exist, e.g., ShinEtsu X521186. Such materials are further described as non-meltable crosslinked organosiloxane resin powders in U.S. Pat. No. 4,769,418, incorporated herein by reference. Effective amounts of the particulate cross-linked hydrocarbyl-substituted polysiloxane anti-blocking agent can range from 100 to 5000 ppm, preferably 1000 to 3000 ppm, say, from 2500 to 3000 ppm, based on loading of the resin from which the upper layer (c) is prepared.

In one embodiment, the lower skin layer (c) contains a silicone oil. The silicone oil advantageously possesses a viscosity of from about 350 to about 100,000 centistokes with 10,000 to about 30,000 centistokes being especially preferred. Examples of suitable silicone oils are polydialkylsiloxanes, polyalkylphenylsiloxanes, olefin-modified siloxane oils, olefin/-polyether-modified silicone oils, epoxy modified silicone oils and alcohol-modified silicone oils, polydialkylsiloxanes which preferably have from about 1 to about 4 carbon atoms in the alkyl group, in particular polydimethylsiloxanes. Of the foregoing, the polydialkylsiloxanes, in particular a polydimethylsiloxane, are preferred for use herein.

The silicone oil can be added to lower skin layer (c) generally in the form of a dispersion or emulsion, the silicone being present within, as well as on the exposed surface of this layer as discrete microglobules, frequently of an average size of from about 1 to about 2 microns. The silicone oil, which is generally substantially uniformly distributed on the exposed surface of layer (c), is responsible for imparting a reduced coefficient of friction to this surface as well as to the exposed surface of layer (a) when some of the oil is transferred thereto after these surfaces have been placed in mutual contact, e.g., as will occur when the laminate film has been wound on a winding coil.

Polydimethylsiloxane or other silicone oil can be present at from about 0.15 to about 1.5 weight percent of lower layer (c). Some of this silicone oil will, of course, be present on the exposed surface of layer (c). The amount selected should in any event be sufficient to provide a coefficient of friction of layers (a) and (c) (following transfer of silicone oil microglobules to the latter) of about 0.4 or less, preferably between about 0.25 to about 0.3 up to at least about 60° C.

Orienting

The proper degree of orientation in the film contributes to the desired physical properties, as well as good WVTR and dead-fold characteristics. For example, it has been determined that films with a thickness of 1.4 to 4 mils will have acceptable WVTR (g-mil/100 in$^2$/24 hr—1 atm) of less than about 0.2/mil whereas a somewhat heavier gauge (1.5 times thicker or more) is needed in a blown HDPE film to achieve the same WVTR. The benefits of reduced WVTR are due to the improvements obtained by orientation below the HDPE melting point. Although higher density HDPE resin having a density of 0.957 or greater can be made directly into thin films by cast extrusion, problems of curling, uniformity, flatness and high WVTR remain as obstacles. Accordingly, thin HDPE films of about 0.8 to 1.5 mils having the best balance of properties, particularly for VFFS applications, are obtained with oriented films prepared from films having a cast gauge of 12 to 20 mils reduced to the desired gauge by orientation. The final film gauge will typically be not more than about 2.5 mils.

The HDPE base film is oriented either before or after the skins are applied to a degree of 1:1 to 2:1, usually from 1.15:1 to 1.50:1, in the machine direction (MD), and to a degree of 6:1 to 12:1 in the transverse direction (TD). The films exhibit improved dead-fold, and other physical properties which are markedly better than cast and blown HDPE films, even when the total film thickness is reduced to less than 1 or 2 mils. When provided with a skin layer as described below, the films are particularly suited for use in packaging, especially of dry foodstuffs. The films may be used in a wide variety of packaging equipment including vertical form, fill and seal (VFFS), high speed horizontal slug wrapping, as well as twist folding packaging machines.

The skin layers can be applied to the HDPE base film in any conventional manner, for example, by coating or coextrusion just before and after orientation or by coating the HDPE after the machine direction orientation and transverse direction orientation operations. Generally, the skin layers of the film of the invention comprise less than 50 wt %, preferably less than 15 wt %, say about 10 wt % of the total film.

The films may be produced and oriented in the conventional manner. When the skin layer is present on one or both sides of the HDPE film, cast extrusion is generally accomplished using a standard cast roll and water bath system.

In the usual manner the film is heated to its orientation temperature and first subjected to MD orientation between two sets of nip rolls, the second rotating at a greater speed than the first in an amount equal to the desired draw ratio. Then the film is TD oriented by heating and subjecting it to transverse stretching in a tenter frame. Typically MD orientation is conducted at 60° to 120° C. and TD orientation at 110° to 160° C.

The skin layers and/or base layer may contain stabilizers to minimize oxidative and thermal degradation, as well as other additives to achieve other functionality including, but not limited to, static reduction, ease of processing, ink receptivity, etc.

The addition of LDPE to the upper skin layer (a) terpolymer provides improved metal to skin adhesion upon metallization as compared to upper skin layer (a) which contains terpolymer alone. The resulting metallized film also exhibits excellent bond strength in both adhesive and extrusion lamination, especially with polypropylene films. Further desirable properties of the base film for metallization, are that it displays an excellent oxygen gas barrier when metallized as well as optical clarity and metal uniformity. It also retains the other desirable properties of metallized oriented film, such as, good water vapor barrier.

The LDPE-containing upper skin layer is believed to be suited for bonding to vaporized materials generally, i.e., not only vaporized metals, but other vaporized materials as well, e.g., glass, plasma, etc.

The invention is illustrated by the following non-limiting examples in which all parts are by weight unless otherwise specified.

EXAMPLE 1 (COMPARATIVE)

A three-layer oriented film having a 1.15 mil final thickness was prepared by coextruding:

a base layer HDPE (M-6211 obtained from Oxychem of Houston, Tex.) comprising 90% of the total film thickness;

an upper skin layer on one side of the base layer comprising 5% of the total film thickness which is Chisso 7510 or 7563, obtained from Chisso Corp. of Japan, consisting of ethylene-propylene-butene-1 terpolymer, the upper skin layer being subjected to treatment by corona discharge; and a lower skin layer on the other side of the base layer (Chisso 7880, obtained from Chisso Corporation of Japan), comprising 5% of the total film thickness, whose resin component is a blend of about 90% ethylene-propylene-butene-1 terpolymer, which lower skin layer further contains 3300 ppm Tospearl SR-344, available from GE.

The film was prepared in a standard cast roll system and then oriented 1.2 times in the MD at about 115° C. and 9.0 times in the TD direction at 110°–160° C. in a tenter frame. The film was then corona treated to a surface energy of 42 to 45 dynes/cm and then metallized with aluminum to an optical density of 2.3±0.2.

The film was then laminated to an oriented polypropylene film, 70 SPW-L available from Mobil Chemical Co. and its adhesive and extrusion bond strengths were measured using a Sutter tester. Extrusion bond strength of this film was measured as 35 g/inch. Adhesive bond strength was 100 g/inch.

EXAMPLE 2

A three-layer biaxially oriented film having a 1.15 mil final thickness was prepared in accordance with Example 1 except that 5 wt % low density polyethylene (LDPE) available from Mobil Chemical Company was compounded with the resin used for both skin layers. The extrusion bond strengths were significantly improved to 115 grams/inch, which directionally indicated a significant improvement in metal adhesion. The addition of LDPE improves the film's ability to accept and maintain a higher level of surface energy treatment. Adhesive bond strength increased to 315 g/inch over that of Example 1.

EXAMPLE 3

A three-layer biaxially oriented film having a 1.15 mil final thickness was prepared in accordance with Example 1 except that 25 wt % low density polyethylene (LDPE) available from Mobil Chemical Company was compounded with the resin used for both skin layers. The extrusion bond strengths were significantly improved to 330 grams/inch. Adhesive bond strength increased to 275 g/inch over that of Example 1.

Melt strengths of the films as measured by viscosity were also improved for LDPE-containing skins, resulting in improved processability due to the additional melt strength from the die to the cast roll in the extrusion process. Film appearance was more consistent with less defects, such as TD haze bands.

EXAMPLE 4

A three-layer biaxially oriented film having a 1.15 mil final thickness was prepared in accordance with Example 2 except that no Tospearl SR-344 was compounded with the resin used for the lower skin layer prior to coextruding.

EXAMPLE 5

The films of Examples 2 and 4 were tested for kinetic coefficient of friction values for both their treated and untreated skins according to the procedure of ASTM D 1894-78. The results are set out below in the Table.

TABLE

|  | Untreated Skin COF |
| --- | --- |
| EX. 2 (3300 ppm Tospearl) | 0.30 |
| EX. 4 (0 ppm Tospearl) | 0.75 |

Based on the above Examples, the addition of particulate silicone reduced coefficient of friction (COF) from 0.75 to 0.3. The lower COF would most likely improve the machinability of this metallized OHD film in some applications. In addition, this anti-block additive did not scratch the metallized surface when rewound after metallization. Thus, no negative effects on barrier properties were observed by adding this additive to the untreated skin formulation.

It is claimed:

1. A multilayer film structure which comprises:

a) a treated upper skin layer (a) consisting essentially of ethylene-propylene-butene-1 terpolymer and 3 to 30 weight percent based on the weight of the upper skin layer of a low density polyethylene, b) a base layer comprising high density polyethylene, and c) a lower skin layer (c) comprising ethylene-propylene-butene-1 terpolymer, 3 to 30 weight percent of a low density polyethylene based on the weight of the lower skin layer and an antiblock component selected from the group consisting of silicone oil and silicone particulate.

2. A metallized oriented polymer film which comprises:

a) an upper skin layer (a) having an inner surface adherent to an upper surface of a base layer (b), and an outer treated surface which is metallized, said upper skin layer (a) consisting essentially of ethylene-propylene-butene-1 terpolymer and 5 to 25 weight percent based on the weight of the upper skin layer of a low density polyethylene, b) a base layer (b) comprising high density polyethylene, the base layer having an upper surface and a lower surface, c) a lower skin layer (c) having an inner surface adherent to said lower surface of base layer (b), and an outer surface, said lower skin layer (c) comprising ethylene-propylene-butene-1 terpolymer and 5 to 25 weight percent based on the weight of the lower skin layer (c) of low density polyethylene and an antiblock effective amount of an antiblock component selected from the group consisting of (i) a silicone particulate and (ii) silicone oil.

3. A metallized oriented polymer film which comprises:

a) an upper skin layer (a) having an inner surface adherent to an upper surface of a base layer (b), and an outer treated surface which is metallized, said upper skin layer (a) consisting essentially of ethylene-propylene-butene-1 terpolymer and 5 to 25 weight percent based on the weight of the upper skin layer (a) of a low density polyethylene, b) a base layer (b) comprising high density polyethylene, the base layer having an upper surface and a lower surface, c) a lower skin layer (c) having an inner surface adherent to said lower surface of base layer (b), and an outer surface, said lower skin layer (c) comprising ethylene-propylene-butene-1 terpolymer and 5 to 25 weight percent based on the weight of the lower skin layer (c) of a low density polyethylene and an antiblock effective amount of a particulate silicone.

4. A metallized oriented polymer film comprising:

a) an upper skin layer (a) having an inner surface coextensively adherent to an upper surface of a base layer (b), and an outer treated surface which is metallized, said upper skin layer (a) comprising ethylene-propylene-butene-1 terpolymer and 5 to 25 weight percent of a low density polyethylene, based on the weight of the upper skin layer (a), b) a base layer (b) comprising high density polyethylene, the base layer having an upper surface and a lower surface, c) a lower skin layer (c) having an inner surface adherent to said lower surface of base layer (b), and an outer surface, said layer (c) containing ethylene-propylene-butene-1 terpolymer, low density polyethylene and an antiblock effective amount of a cross-linked hydrocarbyl-substituted polysiloxane.

5. A metallized oriented polymer film comprising:

a) an upper skin layer (a) having an inner surface coextensively adherent to an upper surface of a base layer (b), and an outer treated surface which is metallized, said upper skin layer (a) comprising ethylene-propylene-butene-1 terpolymer, and 5 to 25 weight percent of a low density polyethylene based on the weight of the upper skin layer (a), b) a base layer (b) comprising high density polyethylene, the base layer having an upper surface and a lower surface, c) a lower skin layer (c) having an inner surface adherent to said lower surface of base layer (b), and an outer surface, said layer (c) containing ethylene-propylene-butene-1 terpolymer.

* * * * *